US009843582B2

(12) United States Patent
Mahendrakar et al.

(10) Patent No.: US 9,843,582 B2
(45) Date of Patent: *Dec. 12, 2017

(54) IDENTITY VERIFICATION SYSTEMS AND METHODS

(71) Applicant: TRANS UNION, LLC, Chicago, IL (US)

(72) Inventors: Alka Mahendrakar, Marietta, GA (US); Kehang Chen, Suwanee, GA (US); Luis Obregon, Birmingham, AL (US)

(73) Assignee: Trans Union LLC, Chicago, IL (US)

( * ) Notice: Subject to any disclaimer, the term of this patent is extended or adjusted under 35 U.S.C. 154(b) by 54 days.

This patent is subject to a terminal disclaimer.

(21) Appl. No.: 14/246,991

(22) Filed: Apr. 7, 2014

(65) Prior Publication Data

US 2014/0223581 A1  Aug. 7, 2014

Related U.S. Application Data

(63) Continuation of application No. 13/340,575, filed on Dec. 29, 2011, now Pat. No. 8,695,105.

(Continued)

(51) Int. Cl.
*G06F 7/04* (2006.01)
*G06F 17/30* (2006.01)
(Continued)

(52) U.S. Cl.
CPC ............ *H04L 63/10* (2013.01); *G06F 21/31* (2013.01)

(58) Field of Classification Search
CPC .......... G06F 21/00; G06F 21/10; G06F 21/60; H04L 63/10

(Continued)

(56) References Cited

U.S. PATENT DOCUMENTS 6,230,928 B1 * 5/2001 Hanna .................. G07D 1/00
221/13
6,263,446 B1 * 7/2001 Kausik ................. G06F 21/6245
380/259

(Continued)

OTHER PUBLICATIONS

"Search Report and Written Opinion for PCT Application No. PCT/US2011/067961 dated on Jun. 25, 2012".

*Primary Examiner* — Dant Shaifer Harriman
(74) *Attorney, Agent, or Firm* — Neal, Gerber & Eisenberg LLP

(57) ABSTRACT

Systems and methods for authenticating the identity of a user prior to giving access to confidential data at a user interface via a network are described. In an exemplary implementation in an Internet environment, a server hosts an application providing selective access by the user to confidential data related to the user. The user provides initial data to the application as part of a request to access the confidential data. At least one database having the confidential data stored therein is accessed by the server to retrieve confidential data relating to the user located in the database based on the initial data received from the client interface. An exam creation function causes the server to create an exam comprising at least one question based at least in part on a portion of the confidential data relating to the user. This function creates the exam based on at least one exam definition. An exam administration function causes the server to transmit the exam to the client interface for presentation to the user. The user is granted access to the confidential data subsequent to determination that the user successfully passed the exam.

25 Claims, 15 Drawing Sheets

Related U.S. Application Data

(60) Provisional application No. 61/428,774, filed on Dec. 30, 2010.

(51) Int. Cl.
  *H04N 7/16* (2011.01)
  *H04L 29/06* (2006.01)
  *G06F 21/31* (2013.01)

(58) Field of Classification Search
  USPC .......................................................... 726/28
  See application file for complete search history.

(56) References Cited

U.S. PATENT DOCUMENTS

| | | | |
|---|---|---|---|
| 7,886,346 B2* | 2/2011 | Sandhu | G06F 21/31 709/229 |
| 2002/0073339 A1 | 6/2002 | Card | |
| 2004/0078603 A1* | 4/2004 | Ogura | G06F 21/31 726/28 |
| 2006/0041930 A1* | 2/2006 | Hafeman | G06F 21/6245 726/2 |
| 2007/0107051 A1 | 5/2007 | Carter | |
| 2009/0187962 A1* | 7/2009 | Brenneman | G06F 21/316 726/1 |
| 2009/0288150 A1 | 11/2009 | Toomim et al. | |

* cited by examiner

| STEP 1 | STEP 1 | STEP 3 | STEP 4 |
|--------|--------|--------|--------|
| ● | ○ | ○ | ○ |

PLEASE VERIFY YOUR PHONE NUMBER

PLEASE CHOOSE YOUR TELEPHONE NUMBER. OUR AUTOMATED SYSTEM WILL CALL YOU AT THIS NUMBER

○ (XXX) XXX-1212        ○ (XXX) XXX-4503
○ (XXX) XXX-6849        ○ (XXX) XXX-6649
○ (XXX) XXX-9834        ○ NONE OF THE ABOVE

| CONTINUE WITH TELEPHONE AUTHENTICATION | I WILL WAIT FOR AUTHENTICATION BY MAIL |

DID NOT MATCH

TransUnion DecisionCentre-QA Activity-Question

Question Type #: Multiple Choices Single Answer
Question Value: String

Group #: Demographic
Fake Answer Generation #: xpath:({Q01_FakeAddressList},items/Address}

Weight #: 10
Real Answer Data Element #: Q01_RealPreviousAddress

Total No. of Options#: 4
Status: --DataElement-- | Q01_Flag

☐ Correct Answer Required

Questions In

English (United States) [en-US]
Q4501-Which of these address have or had a relationship with you?

Spanish (Guatemala) [es-GT]
Q4501-¿Con cual de las siguient direcciones ha tenido cien algun vincula?

Save    Cancel

FIG. 7

Summary Hit Count Report

DateReport: 7/30/2010

Subscriber: 4225303

Total Transactions: 29

| Category | Validation | Message | Count |
|---|---|---|---|
| First Validation | Aprobado | | 23 |
| | Rechazado | Persona no se encuentra en la | 6 |
| Second Validation | Error al generar el cuestionario | | 1 |
| | Examen Generado | | 22 |
| Third Validation | Aprobado | | 9 |
| | No respondio | | |
| | Rechazado | | 1 |

FIG. 8

Summary Hit Count Report

Report Date: 7/30/2010
Subscriber Code: 4225303
Total Transactions: 23

| Number of tries | Number of People | Total Transactions |
|---|---|---|
| 1 | 6 | 6 |
| 2 | 4 | 8 |
| 3 | 0 | 0 |
| 4 | 1 | 4 |
| 5Plus | 1 | 5 |

FIG. 9

ID Verifications - Details Hit Count

Activiation_Pospaid_Testing

| Applicant First Name | Year | Month | Day | Decision | Total Count |
|---|---|---|---|---|---|
| BRENDA ORTIZ | | | | | 1 |
| | 2010 | | | | 1 |
| | | 7 | | | 1 |
| | | | 29 | | 1 |
| | | | | ExamenAprobado | 1 |
| BRENDA VALDERRAMOS | | | | | 2 |
| | 2010 | | | | 2 |
| | | 7 | | | 2 |
| | | | 29 | | 2 |
| | | | | ExamenAprobado | 1 |
| | | | | ExamenRechazado | 1 |
| CARLOS LIMA | | | | | 1 |
| | 2010 | | | | 1 |
| | | 7 | | | 1 |
| | | | 29 | | 1 |
| | | | | ExamenAprobado | 1 |
| ERIK MARIN | | | | | 1 |
| | 2010 | | | | 1 |
| | | 7 | | | 1 |
| | | | 29 | | 1 |
| | | | | ExamenRechazado | 1 |
| GERMAN CACHEO | | | | | 2 |

FIG. 10

Detailed Transaction Report

TELEFONICA DE GUATEMALA Agencia CONTROL DE RIESGO

| Strategy | Application ID | Applicant ID | Consumer Name | Decision | Date Time | Score | DOB | Message | Employee |
|---|---|---|---|---|---|---|---|---|---|
| Activation_Po spaid_Testing | | | | | | | | | |
| | 57 | A010010554 | JAMIE VALDERRAMOS | ExamenRechazado | 7/29/2010 3:10:53 PM | 2 | 1981/07/10 | Usted ha fallado el examen | gtjevalder |
| | 58 | A010010691 | CARLOS LIMA | ExamenAprobado | 7/29/2010 3:14:38 PM | 3 | | Felicidades, usted a aprobado el examen | gtjevalder |
| | 59 | A010012268 | JESSICA SOLORZANO | ExamenRechazado | 7/29/2010 3:18:45 PM | 2 | 1987/07/24 | usted ha fallado el examen | gtjevalder |
| | 60 | A010012434 | BRENDA ORTIZ | ExamenAprobado | 7/29/2010 3:21:56 PM | 3 | 1988/02/14 | Felicidades, usted a aprobado el examen | gtjevalder |
| | 61 | A010011683 | SAMUEL SANCHEZ SAMUEL SANCHEZ | ExamenAprobado | 7/29/2010 3:21:18 PM | 3 | 1985/07/21 | Felicidades, usted a aprobado el examen | gtsesanche |
| | 62 | A010010577 | ERIK MARIN ERIK MARIN | ExamenRechazado | 7/29/2010 3:25:23 PM | 1 | 1982/08/11 | usted ha fallado el examen | gtjevalder |
| | 63 | A010011683 | SAMUEL SANCHEZ | ExamenAprobado | 7/29/2010 3:29:05 PM | 4 | 1985/07/21 | Felicidades, | gtjevalder |

FIG. 11

ID Verifications - Questions Analysis Report

From Date 6/1/2010
To Date 6/16/2010
Subscriber Code

| Question Code | # of times asked | # of times real | # of times dummy | Answered Okay | Answered Wrong | Not Answered |
|---|---|---|---|---|---|---|
| Q1416 | 14 | 14 | | 14 7.142857142857 % | 71.428571428571 % | 21.428571428571 % |
| Q2710 | 8 | 8 | | 8 0% | 25% | 21.428571428571 % |
| Q3618 | 23 | 23 | | 23 4.3478260869652 % | 13.043478260869 % | 82.608695652173 9 |
| Q4501 | 63 | 63 | | 0 7.9365079365079 4 | 22.222222222222 % | 69.841269842698 |
| Q4506 | 29 | 29 | | 1 13.793103448759 % | 27.586206985517 % | 58.620689655172 4 |
| Q5108 | 7 | 7 | | 0 28.571428571428 6 | 71.428571428571 % | |
| Q5419 | 50 | 50 | | 50 2% | 24% | |
| Q6305 | 32 | 32 | | 0 9.375% | 12.5% | |
| Q7915 | 7 | 7 | | 7 0% | 57.142857142857 1 | 42.851428751429 % |
| Q8107 | 17 | 17 | | 17 5.8823529417647 % | 47.058823529418 % | 47.058823529418 % |
| Q8313 | 22 | 22 | | 22 0% | 22.727272727273 % | 72.727272727272 7 |
| Q9302 | 64 | 64 | | 64 7.8125% | 28.125% | 64.0625 |
| Q9321 | 22 | 22 | | 22 0% | 36.363636363636 4 % | 63.636363636363 6 % |

IDENTITY VERIFICATION SYSTEMS AND METHODS

RELATED APPLICATION

This application is a continuation application of U.S. patent application Ser. No. 13/340,575 filed on Dec. 29, 2011 which claims priority to U.S. Provisional Patent Application No. 61/428,774, filed Dec. 30, 2010.

TECHNICAL FIELD

The following disclosure relates to identity verification, and more particularly, to systems and methods for authenticating the identity of an individual prior to allowing access to confidential or secure information pertaining to that individual, such as a credit file or report, particularly over computer connections across a network, such as the Internet.

BACKGROUND OF THE INVENTION

The consumer lending industry bases its decisions to grant credit or make loans, or to give consumers preferred credit or loan terms, on the general principle of risk, i.e., risk of foreclosure. Credit and lending institutions typically avoid granting credit or loans to high risk consumers, or may grant credit or lending to such consumers at higher interest rates or other twits less favorable than those typically granted to consumers with low risk. As a means to quantify risk and allow for relative comparison between individual consumers, lenders use a credit score. A credit score is a numerical approximation of risk associated with an individual consumer and is generated based on that consumer's credit history. Credit bureaus have evolved to generate various types of credit scores based on respective proprietary processing of underlying credit information and other data related to an individual. These credit scores are marketed under various trade names, such as True Credit® by TransUnion, VantageScore$^{SM}$ by VantageScore Solutions LLC, FICO® by Fair Isaac Corporation, etc., and are all intended to provide the best possible risk indicator for a particular individual. Among other things, the credit bureaus assess the credit history of individual consumers, process and maintain credit scores, and present credit score to lenders upon request.

As the credit score represents a consumer's ability to obtain and maintain credit, it is important for consumers to monitor their score. While the credit score is typically a product of the consumer's activities, it is possible that the activities of others, whether through fraud or through unknown but authorized use, may affect the credit score as well. In such cases, a consumer may be able to correct harm, or at least prevent further harm, to their credit file if such activities are identified through the monitoring process and addressed in a timely manner. If unintended activities are not identified by a consumer and rectified in a timely manner, severe damage to that consumer's credit score can occur, which may significantly impair that consumer's ability to obtain credit or a loan.

Due to the increasing importance of monitoring credit files, systems have been developed to help consumers with the process. Such systems, for instance, may alert the consumer when certain activity has occurred that will negatively affect their credit score. However, for security reasons, no specific information would generally be relayed. Rather, the consumer, upon receiving an alert, must check his or her credit file manually to determine the validity of the new credit transactions. Other reasons a consumer might need quick access to their credit file may include: to determine how much credit is likely to be available to them; to ascertain their credit score; or to simply check what active accounts are attached to their credit.

The increasing availability of networks such as the Internet, and especially the improved ability to present data in a secure manner through a webpage on the Internet—such as, for example, through application of secure sockets layer (SSL) protocol or Virtual Private Networks (VPNs)—have enabled the development of systems and related services for viewing secure information remotely via a client device or interface, such as a personal computer, laptop or mobile device having internet or network functionality. The Internet in particular provides a powerful and widely accepted medium for such systems due to its ubiquitous nature. A consumer wishing to view his or her credit history may now do so over any device having direct connectivity or indirect access to the Internet, provided that the consumer can be properly authenticated and his or her credit file can be found. In addition, many other sources of private, secure information can be made available through use of the Internet. For example, banks or other financial service entities might make account history available to account holders, insurance companies might make claims or other account information available to their clients, hospitals or other medical care providers might make patient medical records available to their patients, academic institutions might make tuition statements or grades available to their students, the government might make tax history available to tax payers, etc. In essence, any organization that generates or collects private information on individuals might benefit by using the Internet to display or deliver that information directly to those individuals, rather than relying on more costly and time consuming methods of conveying such information.

A first step prior to disclosing any such information, however, is to ensure the individual's identity is properly authenticated. If an organization is careless in granting access or displaying information, at a minimum, the secure nature of the data it stores will be compromised, with the potential of having disastrous consequences and liability resulting therefrom. The utility of the Internet in these security sensitive applications cannot be harnessed if this first step is not properly managed.

The traditional means to perform Internet ("on-line" or "web-based") verification is by having the website visitor initially set up an account and provide a set of information that, in theory, only the website visitor would know. Many systems rely on nothing more than a username or account number to identify the account and a password to authenticate the website visitor. While this may be effective, passwords provide little security if they are ascertainable by others. In order to make it harder for others to ascertain passwords, password requirements have become more complex. However, this causes people to often forget them. When a password is forgotten, a back-up method of authentication is required. In other cases, such as with consumer credit files, information may be maintained in the absence of a specific account and password. For instance, a credit bureau collects a consumer's credit history regardless of whether he or she has ever contacted the credit bureau to establish a personal account and password. Thus, credit bureaus cannot rely on a consumer having a password, but must authenticate the consumer through other means should they seek access to their credit file.

The method generally used when a password is forgotten, or when such a means of authentication is not suitable, is to ask a website visitor one or more personal questions through the website interface. The answers to these questions are stored within the website visitor's file and have either been previously supplied by the website visitor or consist of certain private data that only the website visitor would likely know. When such questions are presented and answered correctly, system designers can have a higher level of confidence that the website visitor has been properly authenticated.

While this question and answer process is a generally effective primary means of authentication, and an effective secondary means in the case of password failure, it has its limitations. In some cases, there is simply not enough information within the individual website visitor's file to generate proper authentication questions. In other cases, the website visitor may be presented with questions which they need to look up to properly answer, which may not be readily available. Finally, there is the inevitable scenario where, for any number of reasons, an answer supplied does not match the recorded answer within the account.

In addition, the design and architecture of existing systems that use security question based verification of identity require product release and development life cycles to add new questions or tailor questions to a particular type of subject matter. Such programming is controlled by the system provider. This makes the process of evolving security questions slower and more time consuming because the security questions used are coded into software through standard programming languages such that additions and changes can only be done by computer programmers and not business personnel. Accordingly, it would be beneficial to allow business personnel, including, but not limited to, business personnel of an entity employing or using the system as part of their business process, a simple and efficient way to define questions to be asked to a consumer or details about those questions.

The principles of the invention address these and other problems through the application of additional systems and methods for, among other things, identity verification of a user seeking access to confidential information over a network, such as the Internet. These systems and methods can be used as either primary or back-up means to authenticate users of a network, such as website visitors on the Internet, prior to granting access to confidential information, such as, for example, credit file data. These and other aspects of the invention will become readily apparent from the written specification, drawings, and claims provided herein.

SUMMARY OF THE INVENTION

Systems and methods are provided for verifying the identity of a network user (sometimes referred to herein as "user," or in the case of the Internet, "website visitor") prior to granting the user access to confidential information, such as a secure account or file data associated with the user over the network. These systems and methods have particular, but not exclusive, applicability to website applications associated with the Internet. The systems and methods are designed to, among other things: (1) provide a secondary means for authentication for use in cases where a primary means of having the user answer certain questions fails to authenticate them; (2) provide an alternative primary means of authentication that is both secure, quick and effective, and may be preferable to users in certain situations; (3) utilize a user's device associated with a secondary network, such as a phone line associated with the PSTN or a mobile data device associated with a data network, to provide an additional means of on-line authentication; and (4) provide an authentication tool that can be used simultaneously by various entities that can access various disparate file databases, and can be operated by a third party separate from such entities and/or databases to provide authentication services.

In a particular exemplary embodiment, a system for accessing confidential data of a user via a network comprises a server hosting an application providing selective access by the user to confidential data related to the user; a client interface capable of interfacing with the server via the application, wherein the user provides initial data to the application as part of a request to access the confidential data; and at least one database having the confidential data stored therein, the database being in communication with the server to allow the server to retrieve confidential data relating to the user located in the database based on the initial data received from the client interface. The application includes an exam creation function that causes the server to create an exam comprising at least one question based at least in part on a portion of the confidential data relating to the user. This function creates the exam based on at least one exam definition. The application also includes an exam administration function that causes the server to transmit the exam to the client interface for presentation to the user. The user is granted access to the confidential data subsequent to determination by the application that the user successfully passed the exam.

These and other embodiments, and various permutations and aspects, will become apparent and be more fully understood from the following detailed description and accompanying drawings, which set forth illustrative embodiments that are indicative of the various ways in which the principles of the invention may be employed.

BRIEF DESCRIPTION OF THE DRAWINGS

FIG. 3 is a website interface presenting an exam question according to a particular embodiment of the invention.

FIG. 4 is a screenshot of a customer interface for input of an exam definition according to a particular embodiment of the invention.

FIG. 5 is a screenshot of a customer interface for input of a question group definition according to a particular embodiment of the invention.

FIG. 6 is a screenshot of a customer interface for input of an exam language definition according to a particular embodiment of the invention.

FIG. 7 is a screenshot of a customer interface for input of a single exam question definition according to a particular embodiment of the invention.

FIG. 8 is a screenshot of a Daily Summary Transaction Report generated by a particular embodiment of the invention.

FIG. 9 is a screenshot of a Summary Hit Count Report generated by a particular embodiment of the invention.

FIG. 10 is a screenshot of a Detailed Hit Count Report generated by a particular embodiment of the invention.

FIG. 11 is a screenshot of a Detailed Transaction Report generated by a particular embodiment of the invention.

FIG. 12 is a screenshot of a Questions Analysis Report generated by a particular embodiment of the invention.

FIG. 14 is a screenshot of a menu portion of a parameter configuration interface according to a particular embodiment of the invention.

FIG. 15 is a screenshot of a menu portion of a parameter configuration interface according to a particular embodiment of the invention.

Figure 1:
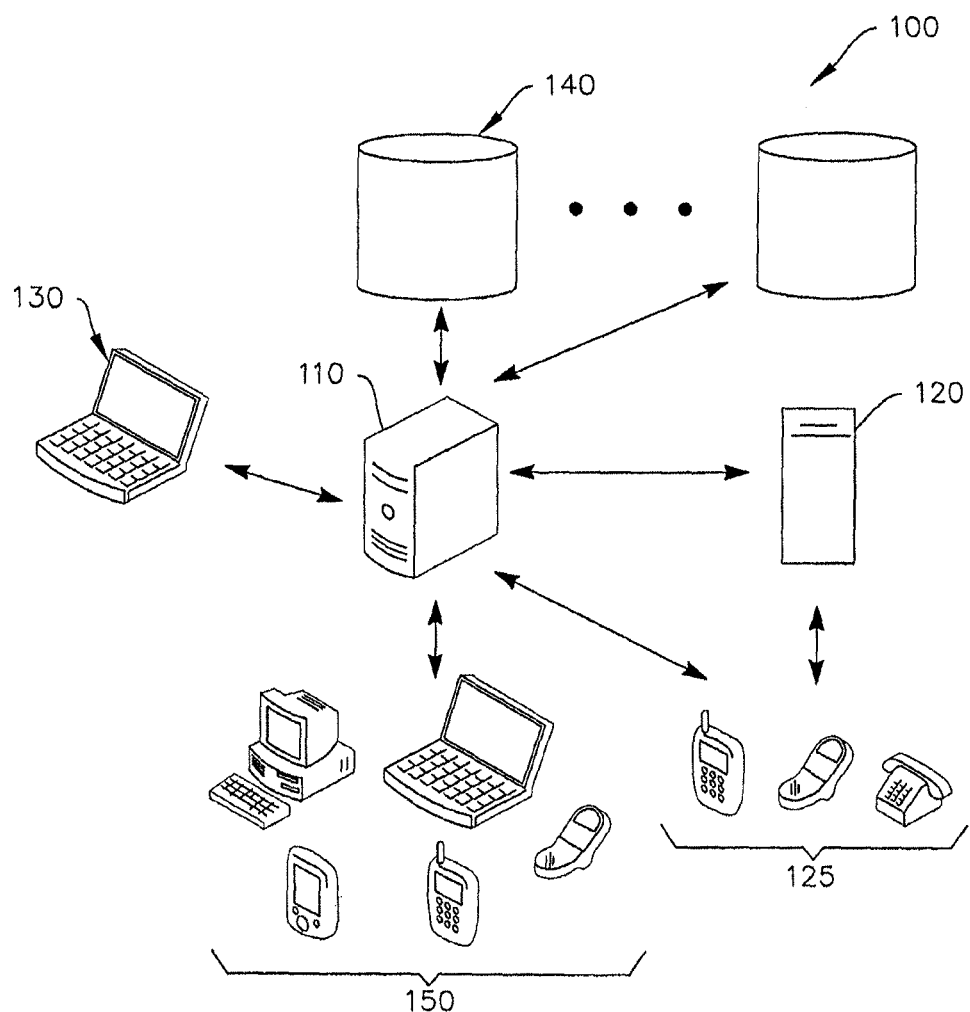
FIG. 1 is a schematic diagram illustrating an exemplary embodiment of a system in accordance with one or more the principles of the invention.

DETAILED DESCRIPTION OF EXEMPLARY
EMBODIMENTS OF THE INVENTION

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

FIG. 1 illustrates components of an exemplary embodiment system in accordance with one or more principles of the invention. For simplicity of presentation, all components that may be employed in one or more of the embodiments described herein are collectively illustrated schematically in FIG. 1, with the understanding that one or more of these components may or may not be included in any particular embodiment depending on functionality and the particular principles being applied. Accordingly, the embodiments described herein should not be limited thereby. With this understanding, a system 100 includes a server 110, which may host an application, such as a web-based server application in applications involving the Internet, which includes an identity verification/authentication function. The server 110 is preferably an interactive server. The system 100 also includes one or more databases 140, which may be co-located with the server 110, or located remotely therefrom. The system 100 also includes a telephony device, such as an automated calling system in the form of an interactive voice response system 120 (IVR), a primary device, such as a client (user) device/interface 150, which may include a web browser or other internet interface functionality in Internet-based applications, and a secondary device, such as, for example, a telephone, or other data or voice communication device 125. These components may be embodied in numerous forms and may differ in various embodiments, and, in some embodiments, two or more components may be combined into a unitary device. Additionally, a particular component may serve more than one function which may have been carried out by other components.

While depicted schematically as a single server, computer or system, it should be understood that the term "server" as used herein and as depicted schematically in FIG. 1 may represent more than one server or computer within a single system or across a plurality of systems, or other types of processor based computers or systems. The server 110 includes at least one processor, which is a hardware device for executing software/code, particularly software stored in a memory or stored in or carried by any other computer readable medium. The processor can be any custom made or commercially available processor, a central processing unit (CPU), an auxiliary processor among several processors associated with the server 110, a semiconductor based microprocessor (in the form of a microchip or chip set), another type of microprocessor, or generally any device for executing software code/instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc., or a 68xxx series microprocessor from Motorola Corporation. The processor may also represent a distributed processing architecture such as, but not limited to, SQL, Smalltalk, APL, KLisp, Snobol, Developer 200, MUMPS/Magic.

Memory can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory may incorporate electronic, magnetic, optical, and/or other types of storage media. Memory can have a distributed architecture where various components are situated remote from one another, but are still accessed by the processor.

The software in memory or any other computer readable medium may include one or more separate programs. The separate programs comprise ordered listings of executable instructions or code, which may include one or more code segments, for implementing logical functions. In the exemplary embodiments herein, a server application or other application runs on a suitable operating system (O/S). A non-exhaustive list of examples of suitable commercially available operating systems is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal digital assistants (PDAs) (e.g., PalmOS available from Palm Computing, Inc., and Windows CE available from Microsoft Corporation). The operating system essentially controls the execution of computer programs, such as any application of server 110, and provides scheduling, input-output control, file and data management, memory management, and communication control and related services.

An exemplary and non-limiting embodiment will now be described having application in an Internet environment. In a particular embodiment, the server 110 is a host computer that hosts a website, web application, or server application (hereinafter generally referred to as "server application" or "web application") wherein users/visitors to the website or clients to the server may access their secure/confidential information. Information may include, but not be limited to, a credit record, a tax record, a medical record, a financial record and an insurance record. In different embodiments, the server 110 and the website it hosts are affiliated with different business entities. For instance, in one embodiment the server 110 is managed by a credit bureau. In other embodiments, it is managed by a bank, an insurance company, a hospital, and various other entities that hold secure information corresponding to website visitors who may wish to access that information. In still other embodiments, the server 110 is operated independently, such as by an application service provider ("ASP"), and provides for third party authentication for various client entities. In certain embodiments, a customer interface or system 130 may be employed to interface with the server 110, wherein the customer interface includes or hosts a web interface or a rich or thick client interface. In certain appropriate embodiments, the client device/interfaces 150 may communicate with or through the customer interface 130.

One or more databases 140 house confidential information referred to above. In some embodiments, one or more databases 140 and the server 110 are housed within the same computer system or on a common network. In other embodiments, one or more databases 140 exists separately, and communication between the two components is provided over the Internet, through a dedicated secure data link, through a secure network or other network, such as for example, a WAN or LAN, or other known means of communicating or transmitting electronic data. Other embodiments may comprise several databases 140, wherein one or more of the databases belong to separate entities, and wherein each database 140 is in direct or indirect communication with the server 110.

Telephone interactive voice response system 120, referred to herein as "the IVR system," which may be employed in certain embodiments, is a computerized automated calling system that, upon request, dials a phone number, plays a pre-recorded message and records responses to that message. The IVR system 120 may comprise a stand alone computer, system, processor, software, or a PC-type telephony card and associated software that is capable of communication with the public switched telephone network ("PSTN"). In some embodiments, the IVR system is in communication with the server 110 through the Internet, a dedicated data link or other network, such as, for example, a WAN or LAN, or other known means of communicating or transmitting electronic data. In other embodiments, the IVR system 120 is co-located with the server 110 and is driven by the same computer or is part of the same system. The IVR system 120 connects with a website visitor's telephone or voice device 125 through the PSTN via any PSTN-computer interface scheme incorporating hardware, firmware, or software known in the art, and may include a telephony interface PCI or PCMCIA card, IP telephony module, VoIP or PSTN gateway, etc. The PSTN interface is preferably part of the IVR system. The website visitor's telephone or voice device 125, sometimes referred to herein as "the phone," may be a cell phone, a land line, or any communication device capable of transmitting and receiving audio and/or keyed-in data such as through an alphanumeric keypad.

The website visitor's device or Internet capable interface 150, sometimes referred to herein as "the website interface" or "client device" or "client interface," may take a variety of forms in different embodiments and allows the website visitor to interact with the website or server application hosted by the server 110. In some embodiments, the website interface 150 is a standard personal computer or laptop, though any computer or electronic device having network or Internet connectivity may be used. In other embodiments, the website interface 150 is a handheld device, such as a cellular telephone, PDA-style device, or other mobile data device with network or Internet capability, such as, for example, a Blackberry® device manufactured by Research In Motion Limited, or an iPhone® device manufactured by Apple, Inc.

According to a particular embodiment, an individual connects his or her interface 150 to the server 110 through the Internet via a web browser application or other interface application and, through the server application hosted by the server 110, makes one or more selections indicating a desire to view secure or confidential data. Preferably, the server 110 utilizes SSL or other secure communications protocol for secure or encrypted communication between the website interface 150 and the server 110. In other embodiments, a VPN may be employed. When the server is accessed via the interface 150, the, application of the server 110 first prompts the website visitor for some basic information (initial data) so as to identify the applicable confidential data set. This information may be in the form of an account number, a full or partial social security number or the website visitor's name and date of birth, for instance. The web application uses this information to search database 140 for the appropriate file. Once the appropriate file is located, the server application generates one or more questions based on the confidential data, along with a series of correct and dummy answers, and presents them to the website visitor via the interface 150. If the website visitor selects the proper number of correct answers, the web application of the server 110 grants the user access to the confidential information.

Figure 2:
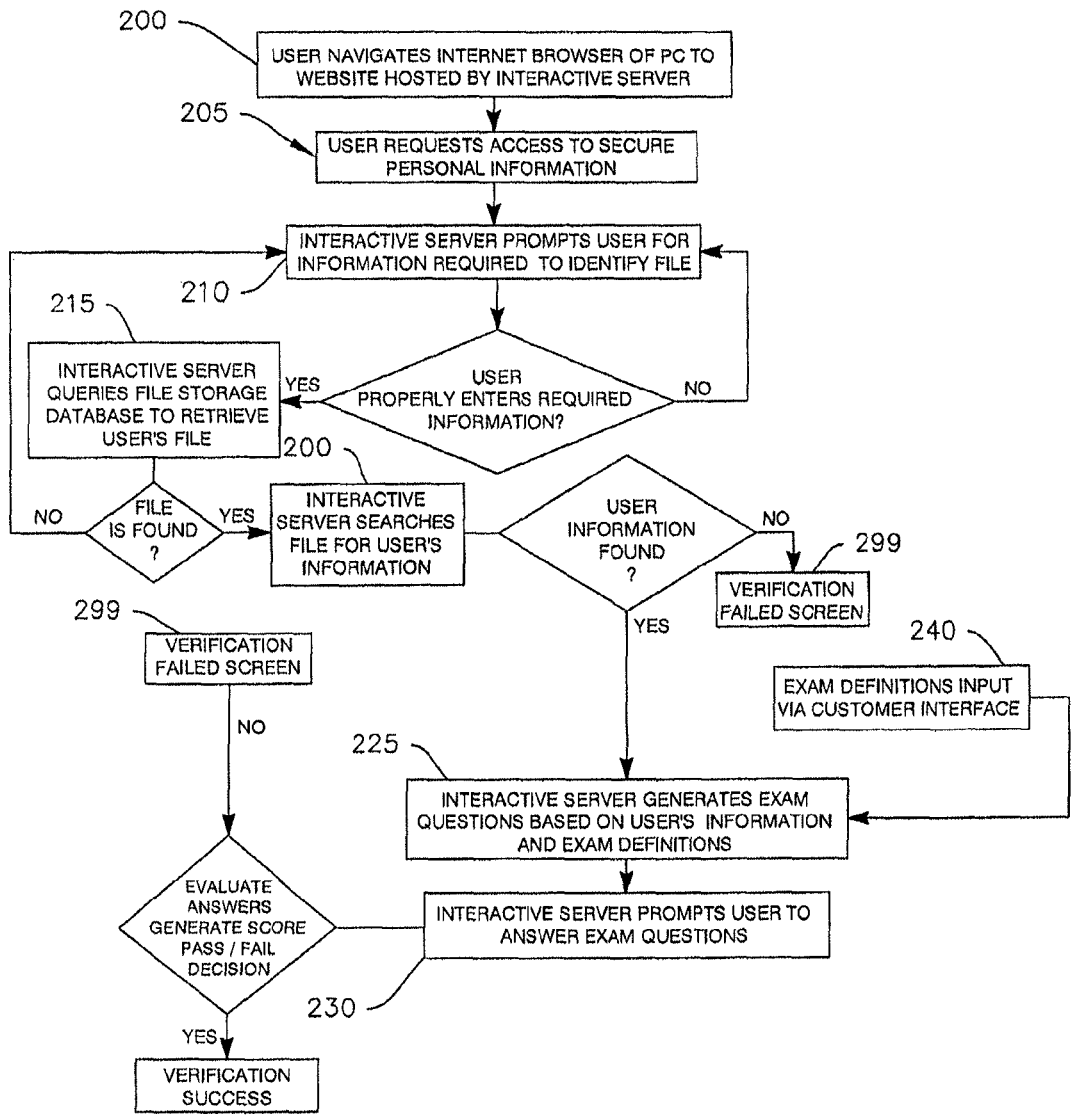
FIG. 2 is a flow chart that graphically depicts the steps of an embodiment of an identify verification process in accordance with one or more the principles of the invention.

The above description provides a general overview of operation of a system according to one or more embodiments. With reference to the flow chart provided in FIG. 2, a more detailed description is given of the steps involved in the foregoing description, along with an understanding of the variations in those steps present in other embodiments. As can be seen with step 200, the process is initiated when a website visitor navigates the website interface 150 to the website or application hosted by the server 110. In some embodiments, the website contains many different HTML pages linked to a homepage. In such cases, the website visitor may be required to navigate through those webpages until reaching the webpage used to request access to secure data. Once arriving at such a webpage, the website visitor in step 205 submits a request for secure data corresponding to their person. An authentication function associated with the web application of the server 110 responds to this request by seeking certain initial data from the website visitor for identification purposes at step 210. In other embodiments, steps 205 and are combined such that the request for secure or confidential data is accomplished directly by supplying the data needed for identification.

The data fields for identification at step 210 vary across the many embodiments, but may include such data fields as name, address, date of birth or full or partial social security number. This type of information is sometimes referred to as "wallet" information, implying that it is of the type of information that is typically found on driver's licenses, Social Security cards, or other identification cards carried in a wallet. In other embodiments, step 210 simply requests an account number. In certain embodiments utilizing the IVR system, step 210 preferably does not solicit entry of a telephone number as that data field may be used later in the process. Whatever fields are chosen for file identification in a particular embodiment at step 210, the website visitor is preferably required to fill in the fields. In certain embodiments, failure to do so may prevent the process from moving forward and present the website visitor with a repeat request for the data.

Once the web application of the server 110 receives data from the data fields, at step 215 it searches the database 140 for a data file matching the data submitted by the website visitor. If a particular data file is found, the process proceeds to step 220. However, if no such file is located based on the submitted data, the process preferably loops back to request corrected data, and the web application of the server 110 generates an error message on the website interface 150 noting that no file was found corresponding to the submitted information. In the alternative case where multiple files correspond to the submitted information, in some embodiments, the web application of the server 110 may respond to the website visitor through the website interface 150 with this result and seek submission of more specific data for identification purposes so as to isolate the correct data file.

As noted above, the server 110 and the database 140 are housed in a single computer in some embodiments, and are physically separate components in other embodiments. In still other embodiments, where there are multiple databases 140 that may be managed by one or more separate entities, a step is incorporated into the process prior to or as part of step 205 whereby the website visitor identifies from which entity he or she is seeking the secure data. Based on this response, in some embodiments, the web application of the server 110 alters the set of required data fields for file identification. For example, a bank and a credit bureau might both contract with a third party authentication service or ASP that utilizes the systems and methods described herein. In such an embodiment, the bank and the credit bureau are unrelated entities, and both are unrelated to the authentication service organization. Each has one or more separate databases 140 which are linked to the authentication service on server 110. In such a scenario, a website visitor first identifies whether he or she wants to view their credit records or their bank records. Based on this input, the web application on server 110 will generate a request for the data fields needed to isolate a specific file within the appropriate database 140. In such fashion, there may be many disparate databases incorporated into the process.

When a particular file has been located based on the data supplied by the website visitor, the web application of the server 110 searches the file for confidential information associated with the website visitor at step 220. In certain embodiments, if no information is found in the file, the authentication process fails and the web application of the server 110 conveys an authentication failure message through the website interface 150 at step 299.

Figure 4:
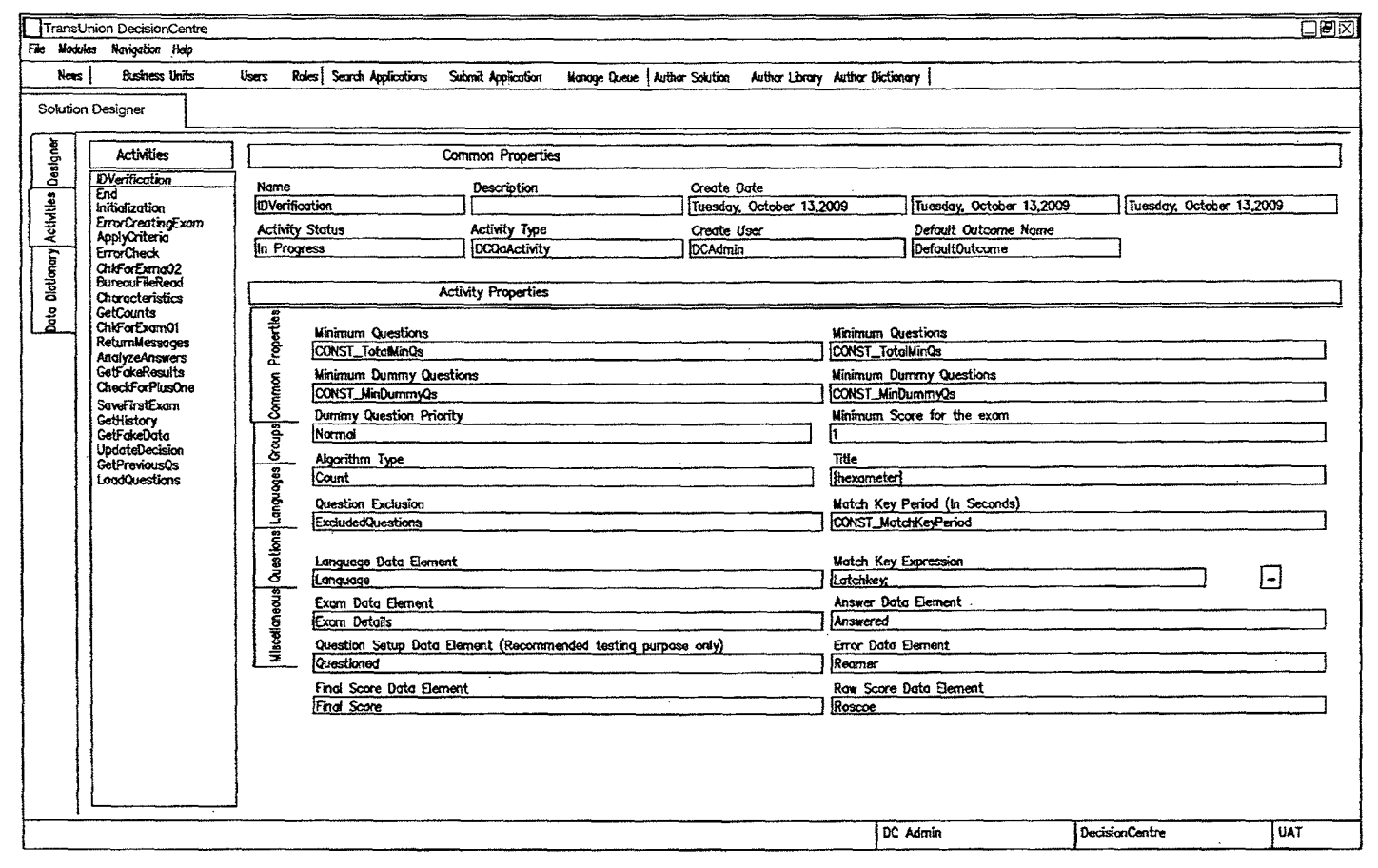

At step 225, the web application of server 110 generates an exam consisting of several questions based at least in part on the confidential information associated with the website visitor. In this embodiment, the exam questions are multiple choice where the server provides a correct or real answer along with some number of incorrect or dummy answers. However, those of ordinary skill in the art will understand that the exam questions could also take on various other forms such as free form answer or picture-supported answers without departing from the novel scope of the present invention. A variety of exam characteristics including how many questions are asked, how many real and dummy answer choices are included for each question, the subject matter of the questions and how many correct answers are necessary to pass the exam are determined by the server according to one or more pre-stored exam definitions. In addition, in embodiments where the exam consists of at least two questions, one of the questions can be set as a dummy question meaning that whether or not it is answered correctly has no bearing on the user's exam score. Exam definitions can by input by a customer entity employing or using the verification system through a customer interface 130 at definition step 240. Those of ordinary skill in the art will understand that a single customer can define a plurality of separate exams for separate purposes if that customer chooses to do so. Merely by way of example, customers may include banks, lenders, credit card companies, mortgage companies, financial institutions, retail entities, automobile dealerships, or any other direct or indirect customer entity of a credit bureau or other entity owning, hosting or providing the system. An exemplary embodiment of a customer interface or GUI for exam definition input is shown in FIG. 4.

Figure 13:
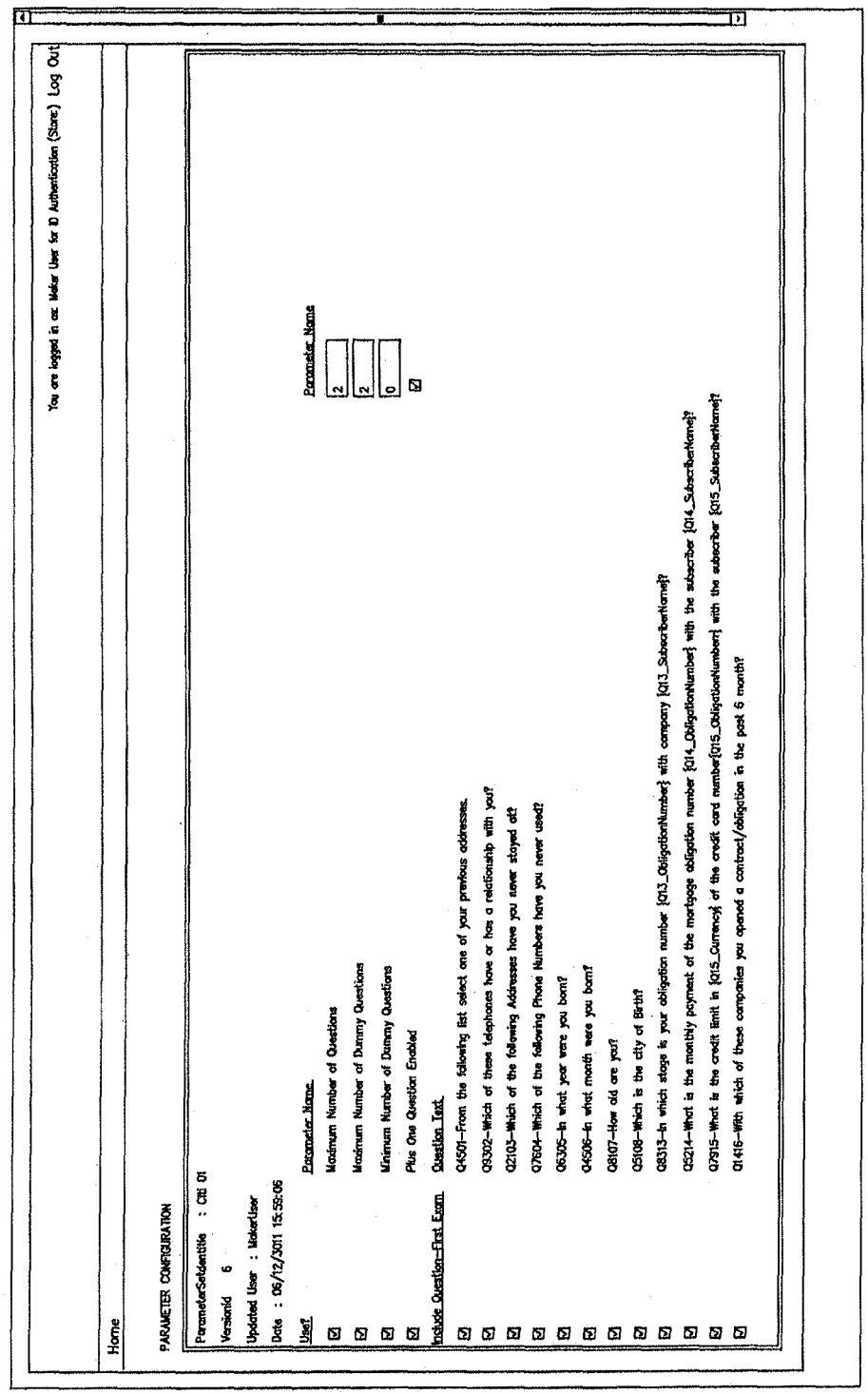
FIG. 13 is a screenshot of a question parameter configuration interface according to a particular embodiment of the invention.
Figure 14:
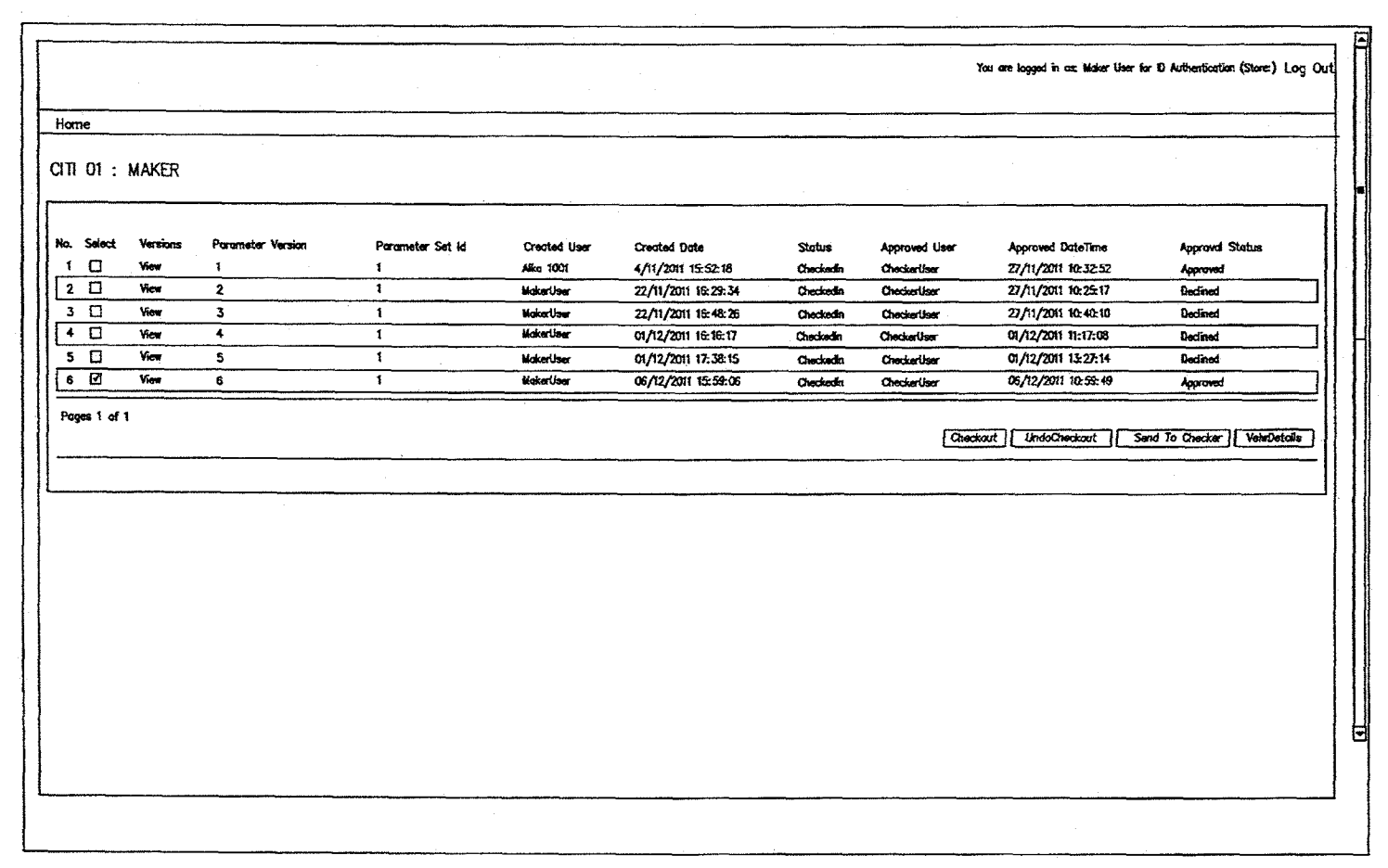
Figure 15:
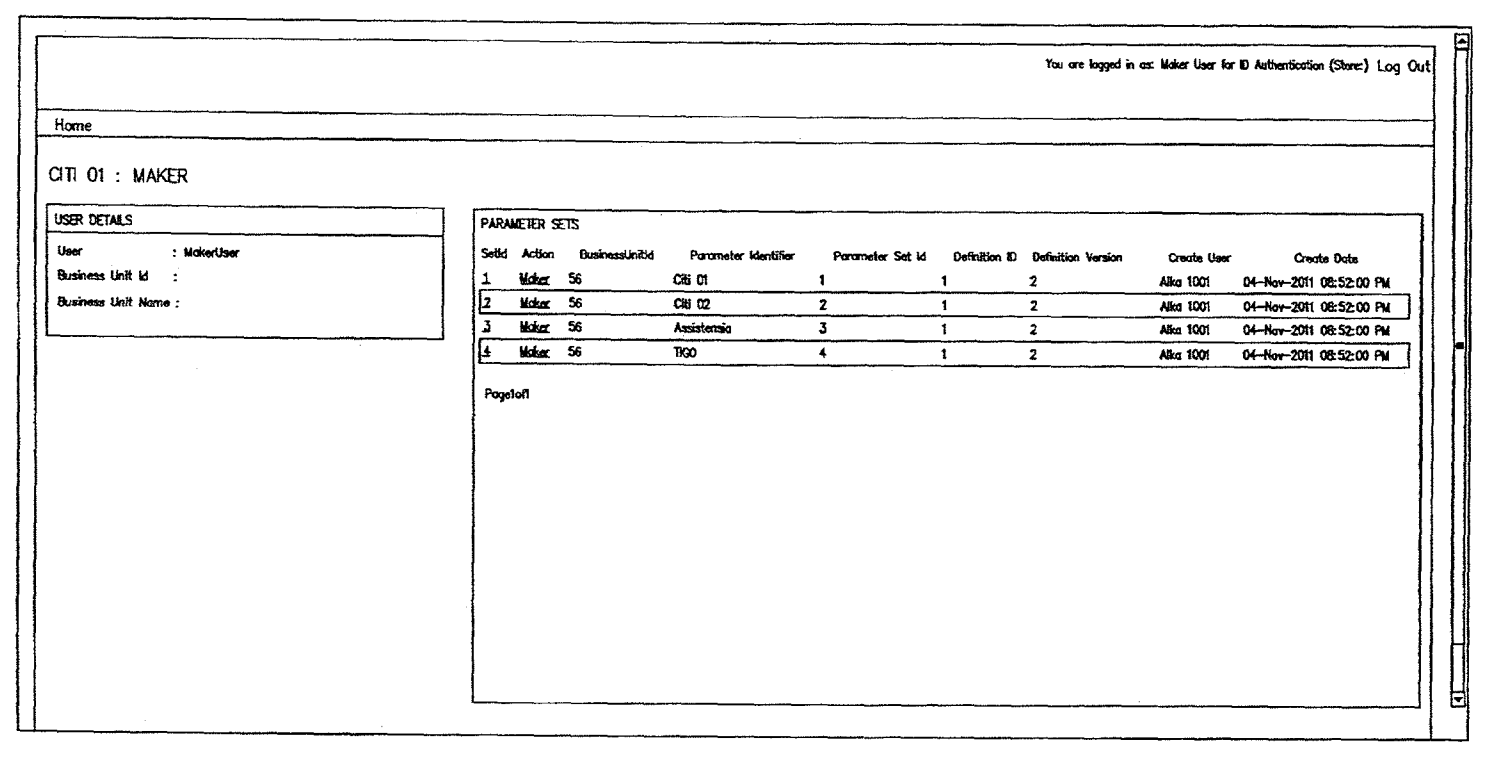

Furthermore, embodiments of the present invention may also include a customer "parameters management" interface that enables business people at a customer to quickly and efficiently manage characteristics of the exam that customer is using to verify identities. For example, a customer employee can interact with a series of interface menus shown in FIGS. 14 and 15 to identify and isolate an exam to be managed. Then, using the interface shown in FIG. 13, the customer employee can readily manipulate various characteristics of the selected exam including but not limited to the number of questions asked, the number of dummy questions asked, and selection of specific questions to be included on or excluded from the exam.

Figure 5:
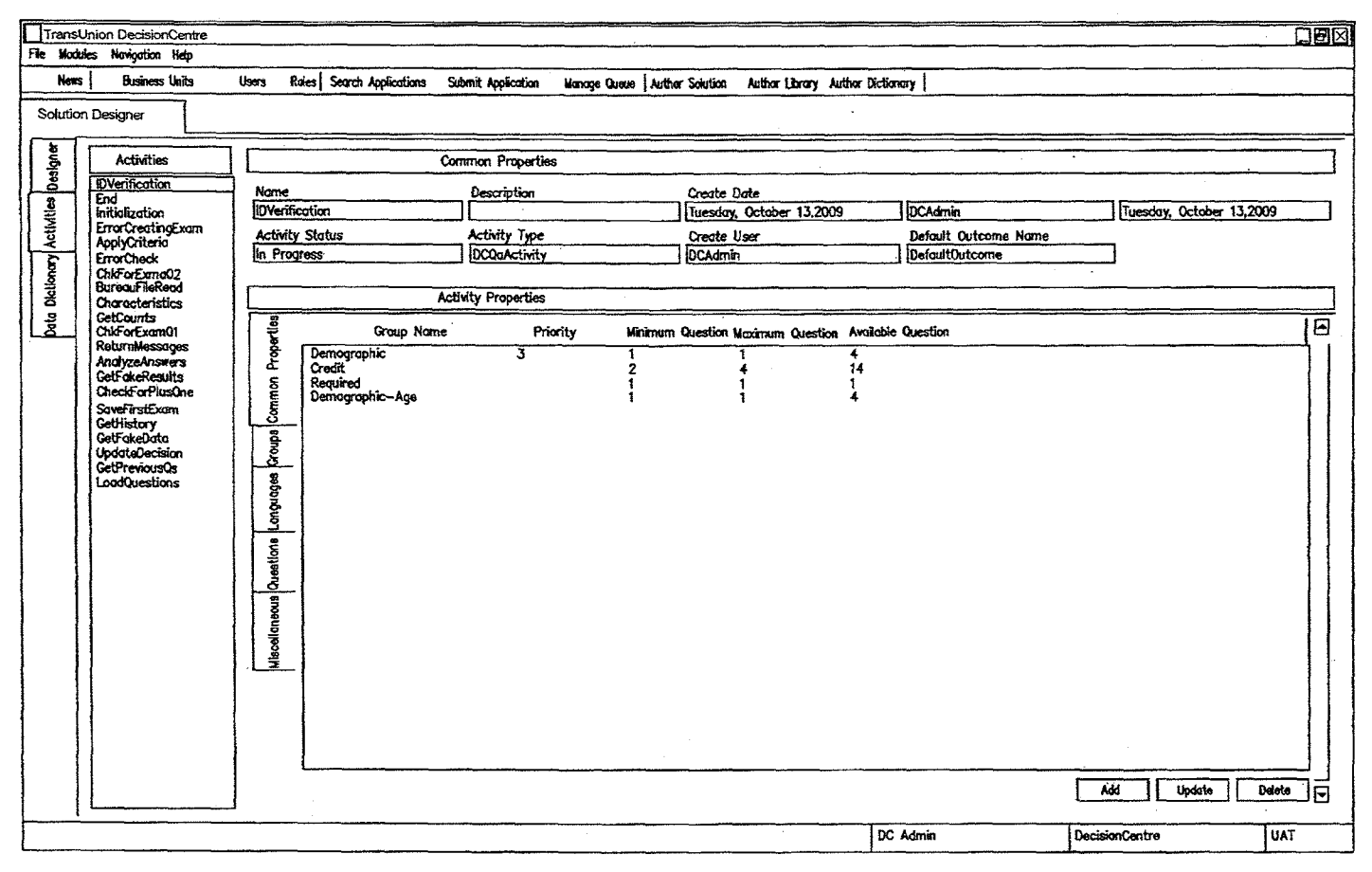
Figure 6:
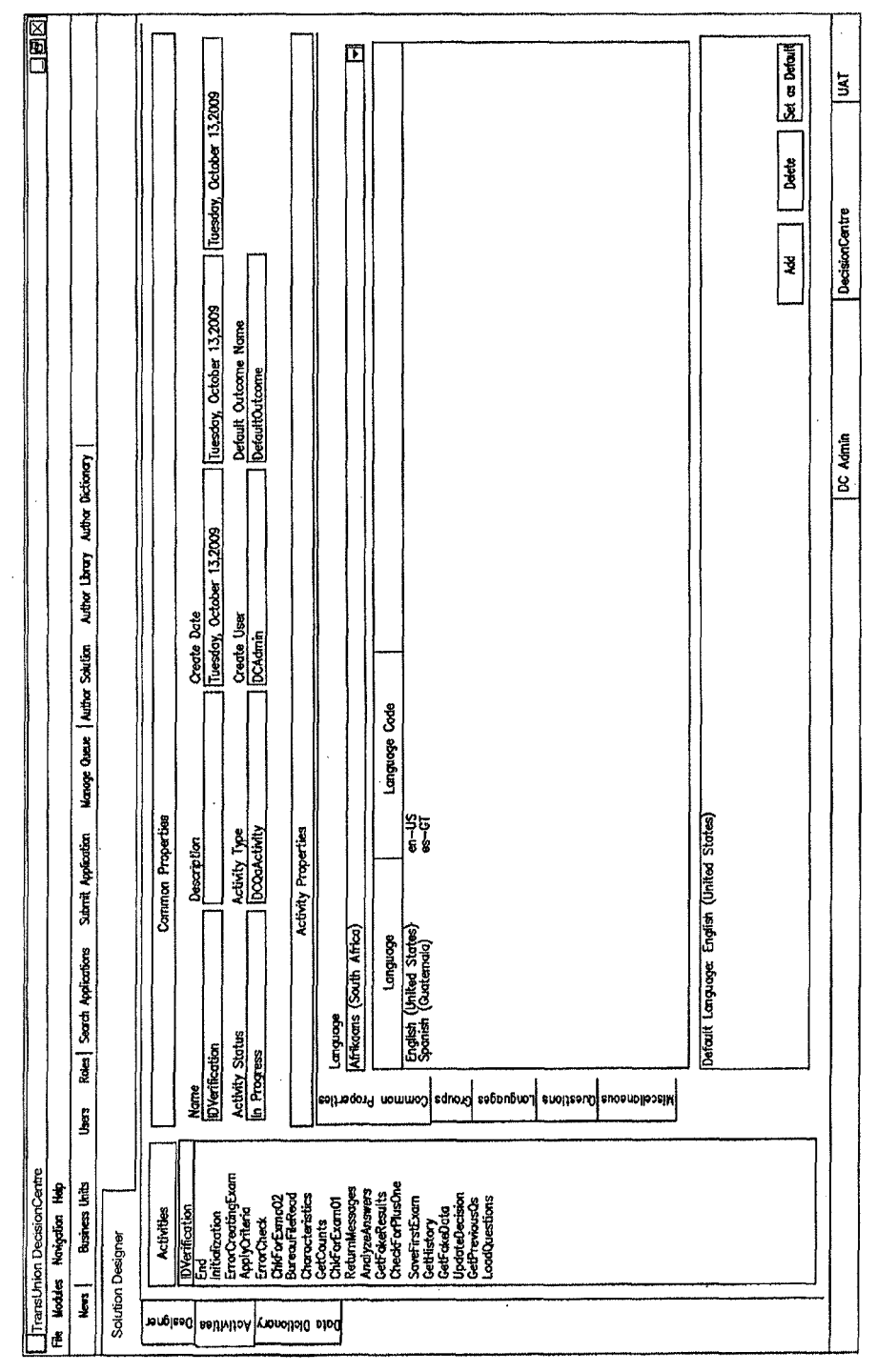

Each exam question can also be categorized into a particular group according to subject matter of the question. Such groups can include demographic information, credit history information or narrower subsets of those categories. Exam definitions can be created using one or more groups such that a specific number of questions from a particular group will be on an exam or that questions from a selected group are given a higher priority or weight on an exam. An exemplary embodiment of a customer interface for group definition is shown in FIG. 5. In addition, once an exam is created, it can be administered in a variety of languages. An exam definition specifying the language that an exam is to be administered in can be created through customer interface 130. An exemplary embodiment of a customer interface for exam language definition input is shown in FIG. 6.

As shown in FIG. 7, in certain embodiments, exam definitions can be created for individual exam questions. Definable characteristics for a single question can include question type, group, data source to generate dummy answers, weight, number of answer choices provided and the text of each question in one or more languages. This functionality allows for the efficient generation of highly customizable exams that are tailored to the needs of a particular customer.

At step 230, the website visitor is requested by the web application of server 110 through the website interface 150 to answer each exam question. Though answering methods vary across embodiments, the illustrated exemplary embodiment in FIG. 3 provides radio buttons to facilitate answer selection. In other embodiments, the IVR system 120 may be fully employed alone, or partially employed in combination with the website interface 150 for presentment and receipt of answers for the exam questions. Upon receiving the visitor's answers to each exam question, the application of server 110 will determine whether the website visitor selected the correct answer to each. If enough questions were answered correctly, then server 110 will display verification success screen at step 245. If not, in certain embodiments, the process may fail and the web application of server 110 will generate a verification failure message at step 299. The threshold for how many correct answers must be received to pass an exam can be set through an exam definition. These thresholds can include a minimum number of questions answered correctly, a minimum score with all questions given equal weight or a minimum score with questions given differing weights.

In certain embodiments, server 110 can generate a variety of reports including a Daily Summary Transaction Report, a Summary Hit Count Report, a Detailed Hit Count Report, a Detailed Transaction Report and a Questions Analysis Report. As shown in FIG. 8, a Daily Summary Transaction Report can include the number of attempts to verify identification received by the system each day. As shown in FIG. 9, a Summary Hit Count Report can include the number of tries it took users to successfully validate their identification each day. As shown in FIG. 10, a Detailed Hit Count Report can include the number of tries it took each individual user to successfully validate their identification each day. As shown in FIG. 11, a Detailed Transaction Report can include a variety of information regarding each identification verification transaction each day including the user's name and ID number, the date and time of the transaction, the user's date of birth, the user's exam score and the server's decision regarding whether the exam was passed or failed. As shown in FIG. 12, a Questions Analysis Report can include a variety of statistical data regarding the exam questions asked including the number of time a particular question was asked and the percentages of when the question was answered correctly and incorrectly.

While many of the foregoing embodiments have been described in the context of specific exemplary embodiments, such description is not intended to be limiting. For example, while many of the foregoing embodiments have been described in the context of the Internet, it is again noted that one or more principles of the invention may be incorporated in the context of any type of network environment wherein a user seeks access to secure or confidential data associated with the user. Furthermore, it is contemplated that the exam question presentation and administration functionality of the system may be employed in a variety of contexts, including, but not limited to, presentation and administration of exams in an educational, institutional or business environment.

It should be understood that the invention is not be limited to any single embodiment and should only be construed in breadth and scope in accordance with recitation of the appended claims.

What is claimed is:

1. A system for accessing confidential data of a user via a network, the system comprising:
   a web server hosting an application providing selective access by the user to the confidential data related to the user via a client interface, wherein the application is configured to request and receive initial data from the client interface as part of a request by the user to access the confidential data related to the user, wherein the initial data includes a first level of identifying information about the user;
   at least one database having the confidential data stored therein, the at least one database in communication with the server to allow the server to retrieve, from the at least one database, confidential data relating to the user based on the initial data received from the client interface; and
   a customer interface comprising one or more input fields configured to receive a plurality of customizable exam definitions entered by an entity that manages the confidential data,
   wherein the application is configured to locate the confidential data related to the user stored on the at least one database based on the initial data, the application including an exam creation function that causes the server to automatically create an exam based on the plurality of exam definitions and the located confidential data related to the user comprising at least one question based at least in part on a portion of the confidential data relating to the user, wherein the application further includes an exam administration function that causes the server to transmit the exam to the client interface for presentation to the user, and a report generation function that enables the creation of a report, and
   wherein the user is granted access to the confidential data subsequent to determination by the application that the user passed the exam.

2. The system of claim 1, wherein the first level of identifying information about the user includes at least one of the user's name, address, date of birth, and full or partial social security number.

3. The system of claim 1, wherein the network includes the Internet, and the client interface is connected to the web server via the Internet.

4. The system of claim 3, wherein the client interface includes a web browser on a personal computer, a laptop, or a mobile device.

5. The system of claim 1, wherein the plurality of exam definitions includes (a) a minimum and maximum number of questions to be included on the exam, (b) a minimum and maximum number of dummy questions to be included on the exam, (c) a type of data from which the exam questions are derived by the application, and (d) a scoring algorithm used by the application to evaluate a user response to the exam questions.

6. The system of claim 1, wherein the plurality of exam definitions includes a specific question drafted by the entity.

7. The system of claim 1, wherein the plurality of exam definitions includes a language that the exam will be administered in by the application.

8. The system of claim 1, wherein the report is a Daily Summary Transaction Report, a Summary Hit Count Report, a Detailed Hit Count Report, a Detailed Transaction Report or a Questions Analysis Report.

9. The system of claim 1, wherein the confidential data comprises data from a record selected from the group consisting of a credit record, a tax record, a medical record, a financial record and an insurance record.

10. The system of claim 5, wherein the scoring algorithm is a minimum score to be achieved with questions having differing weights.

11. The system of claim 5, wherein the dummy questions do not affect an exam score of the user.

12. The system of claim 5, wherein the scoring algorithm is a passing score threshold for the exam.

13. The system of claim 5, wherein the type of data determines a weight of the question.

14. A method for authenticating the identity of a user seeking access to confidential data related to the user via a client interface in communication with a web server, the method comprising the steps of:
   receiving by the server a plurality of customizable exam definitions through a customer interface from an entity that manages the confidential data of the user;
   requesting by the server, and receiving from the client interface, initial data entered by the user, wherein the initial data includes a first level of identifying information about the user for locating in a database the confidential data of the user;
   searching the database in communication with the server for a set of confidential data including at least one portion of the initial data;
   automatically generating an exam based on the plurality of exam definitions and comprising at least one question based at least in part on a portion of the confidential data relating to the user;
   transmitting the exam to the client interface for presentation to the user;
   determining at the server whether the user passed the exam;
   granting access to the confidential data related to the user if the server determines that the user passed the exam; and
   generating a report based on the access granted to the user of the confidential data.

15. The method of claim 14, wherein the first level of identifying information about the user includes at least one of the user's name, address, date of birth, and full or partial social security number.

16. The method of claim 14, wherein the client interface is in communication with the web server via the Internet.

17. The method of claim 14, wherein the client interface includes a web browser on a personal computer, a laptop, or a mobile device.

18. The method of claim 14, wherein the plurality of exam definitions includes (a) a minimum and maximum number of questions to be included on the exam, (b) a minimum and maximum number of dummy questions to be included on the exam, (c) a type of data from which the exam questions are derived by the application, and (d) a scoring algorithm used by the application to evaluate the user response to the exam questions.

19. The method of claim 18, wherein the scoring algorithm is a minimum number of questions to be answered correctly.

20. The method of claim 18, wherein the scoring algorithm is a minimum score to be achieved with all questions having the same weight.

21. The method of claim 18, wherein the scoring algorithm is a minimum score to be achieved with questions having differing weights.

22. The method of claim 18, wherein the dummy questions do not affect an exam score of the user.

23. A non-transitory computer readable medium having software code for execution on a computer processor, for authenticating the identity of a user seeking access to confidential data related to the user over a network via a client interface, comprising:
   a first code segment for requesting and receiving from the client interface initial data entered by the user, the initial data including a first level of identifying information about the user;
   a second code segment for searching a database for the confidential data including at least one portion of the initial data;
   a third code segment for automatically generating an exam based on a plurality of customizable exam definitions and comprising at least one question based at least in part on a portion of the confidential data relating to the user, wherein the exam definitions are received, via a customer interface, from an entity that manages the confidential data of the user;
   a fourth code segment for transmitting the exam to the client interface for presentation to the user;
   a fifth code segment for determining whether the user passed the exam; and the exam;
   a sixth code segment for granting access to the confidential data related to the user if the server determines that the user passed the exam; and
   a seventh code segment for generating a report based on the access granted to the user of the confidential data.

24. The non-transitory computer readable medium of claim 23, wherein the plurality of exam definitions includes (a) a minimum and maximum number of questions to be included on the exam, (b) a minimum and maximum number of dummy questions to be included on the exam, (c) a type of data from which the exam questions are derived by the application, and (d) a scoring algorithm used by the application to evaluate the user response to the exam questions.

25. The non-transitory computer readable medium of claim 23, wherein the plurality of exam definitions includes a language in which the exam will be administered.

* * * * *

UNITED STATES PATENT AND TRADEMARK OFFICE
CERTIFICATE OF CORRECTION

PATENT NO. : 9,843,582 B2  
APPLICATION NO. : 14/246991  
DATED : December 12, 2017  
INVENTOR(S) : Mahendrakar et al.

Page 1 of 1

It is certified that error appears in the above-identified patent and that said Letters Patent is hereby corrected as shown below:

In the Claims

Column 14, Line 33, "passed the exam; and the exam" should be "passed the exam;"

Signed and Sealed this  
Thirteenth Day of March, 2018

Andrei Iancu  
*Director of the United States Patent and Trademark Office*